H. BESSEMER.
Manufacturing Axles, &c., from Iron or Steel.
No. 49,054. Patented July 25, 1865.
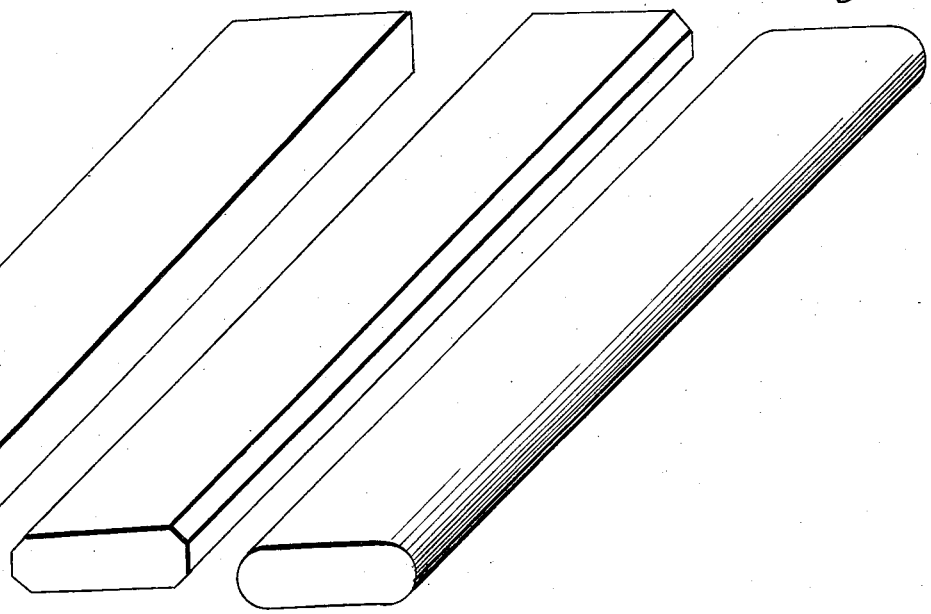

UNITED STATES PATENT OFFICE.

HENRY BESSEMER, OF LONDON, ENGLAND.

IMPROVED PROCESS OF MANUFACTURING AXLES, &c., FROM IRON AND STEEL.

Specification forming part of Letters Patent No. 49,054, dated July 25, 1865.

*To all whom it may concern:*

Be it known that I, HENRY BESSEMER, of Queen Street Place, New Cannon Street, in the city of London, in the Kingdom of Great Britain, have invented certain new and useful Improvements in the Manufacture of Crank-Axles; and I do hereby declare the following to be a full and exact description of the same, reference being had to the accompanying drawings.

In the manufacture of locomotive and other crank-axles by welding together several bars or slabs of wrought-iron it frequently happens that the pieces so to be united are not perfectly welded throughout the whole of their contiguous surfaces, thus forming flaws or cracks which weaken the metal at those parts where they occur, and greatly augment the liability to fracture whenever the crank-axle is subjected to heavy strains. These defects in welding are more especially injurious when they occur in those parts of the throw of the crank which are at right angles to its axis, and when the flaw also runs in this direction—that is, at right angles to the limb of the crank. The direction in which the grain or fiber of the wrought-iron is cut through in forming a crank-throw from a solid mass or projection on the shaft (by cutting out the webs after the crank is forged) tends also to weaken those parts, and still further to lessen its powers of resistance to heavy strains.

I will now proceed to describe in what manner I manufacture crank-axles, and how I avoid the defects before referred to by the employment of a material and a mode of manufacture whereby the crank-axle may be formed in one piece without welding, and in which the homogeneous character of the metal renders each part capable of resisting an equal amount of strain irrespective of the position it occupies in the mass.

This my invention consists partly in the manufacture of locomotive-engine and other crank-axles from a slab of homogeneous cast malleable iron, semi-steel, or steel, the general configuration or shaping of such mass into a crank-axle being effected by sawing or cutting away such parts of the slab or mass as are not required to form part of it. The superfluous parts, having been removed from the slab, may be forged or rolled into plates, bars, or other useful forms.

In carrying out this part of my invention I prefer to use malleable iron, semi-steel, or steel obtained in a fluid state direct from crude iron, although malleable iron or steel otherwise obtained may be employed. I pour or run the fluid metal into an iron or other suitable mold, so as to obtain an ingot or mass by preference of a square or rectangular form. I then forge or roll such ingot until a flat slab is produced of such dimensions that the intended crank-axle may be obtained therefrom by cutting away the superfluous metal. This I prefer to effect by a circular saw, or by a series of vertical or circular saws, mounted in a suitable frame provided with slides or with a carriage on which the flattened rectangular mass of metal is placed, and by means of which it may be advanced up to the saws, or the saws to it, as required.

I prefer that the saws should travel at a rapid rate, as at present practiced with the sawing apparatus employed in cutting off the ends of railway-bars. This cutting away of the superfluous metal from the slab is effected while the latter is in a heated state, the saws running through or in contact with water, so as to keep them cool, but as the saws will not remove the metal from between the crank-throws I either cut this part down by a wide cold-chisel (in a suitable press or under the hammer) or I remove the piece by drilling after the mass has cooled.

To enable others skilled in the art to more fully understand and construct and use my invention, on the accompanying drawings I have shown in perspective, at Figure 1, a flat slab of cast-steel, semi-steel, or cast malleable iron which has been rolled or hammered from an ingot into the simple rectangular form there represented.

The slab may, if preferred, be formed with flattened angles, as shown at Fig. 2, or it may be rounded at each edge, as shown in Fig. 3. In either case the thickness should be uniform throughout, equal to the greatest thickness or diameter of any part of the crank-axle.

In order to form such plain flat slabs for a double-throw crank-axle suitable for a locomotive-engine I make in it several incisions, as shown in Fig. 4, and marked respectively *a*, *b*, *c*, *d*, and *e*. These incisions, being made perpendicular to the surface of the slab and at right angles to its edges, will form at once and with considerably accuracy the chief bounding-lines of each throw of the crank, the cuts *c c* and *e e* forming the spaces between the throws, and the cuts *b b* and *d d* determining the thickness of the metal left in each throw. If then two other incisions *a a* be made, the rectangular pieces *f f* will be separated from the general mass, and may afterward be hammered or rolled into plates or bars, or may be otherwise utilized. If also an incision be made by a large flat chisel or cutter while the mass is in a heated state, or if a series of holes be drilled as close together as possible along the dotted lines *g g*, after the mass has cooled, the pieces *h h* may be removed from between the crank-throws in a similar manner. The piece *i* may also be removed by cutting or drilling on the dotted line *j*. Each of the pieces *h h* and *i i* may also be utilized, as before described in reference to the pieces *f f*. The general configuration and proportions of the intended crank-axle will thus be obtained, as shown at Fig. 5. The sharp angles of the rudely-formed crank may then be sawed or cut off while hot or be worked down by the hammer, or they may be removed by the planing-machine or lathe after the metal has cooled down, as may be found desirable.

In some cases where the axis of the crank is long it will be found desirable to leave the end pieces, *n n*, wider than is shown in Fig. 4 by making the incisions on or near the dotted lines *r r*. Those parts of the axle marked *n n* may then be forged down to the required diameter, and will thus be elongated beyond the length of the original slab from which it was formed. The extent to which this elongation is effected may be varied by varying the position of the incisions *r r*.

In lieu of removing the superfluous metal from the flat slab by means of the saw I in some cases employ a slotting-machine for cutting away the superfluous metal from the flat hammered slab, the slotting-machine having several and by preference as many slotting-tools in operation at a time as there are grooves or cuts to be made in the slab, so that when it is once placed in the machine it will be quickly operated upon, the slides of the machine being so arranged as to admit of the necessary variations of size for crank-axle of different forms and dimensions.

When an axle with more than one crank is required I form the throws or cranks in the same plane with each other, and when the superfluous parts of the mass have been cut away I place the rudely-formed crank-axle on a strong iron frame, to which I securely fasten one portion of it, while another portion of it is fastened to a movable part of the frame, the axis of which movable part is coincident with the axis of the crank-axle. Motion is then communicated by suitable gearing or apparatus to this movable part, whereby the crank-axle is twisted until each throw or crank formed thereon is made to assume the desired position, the heat at which this twisting of the axle is effected being such as is found most suitable for the peculiar quality of the metal of which it is composed. After this process the angles may be hammered, cut off, and finished in the usual way. The twisting of the axle so as to cause the different throws formed thereon to assume any desired angle with reference to each other may be effected in cranks of small size by twisting them by hand; or when one of the throws is held beneath a heavy steam-hammer, with the whole weight of the hammer resting on it, the other throw may be forced round with a lever until they assume the desired relative position, the twisting of the metal taking place between the points marked *m m*, Fig. 5; but when the size of the crank-axle is such as to prevent its being twisted in this manner, then any suitable apparatus may be employed for twisting it, as will be readily understood by engineers and others engaged in the manufacture of crank-axles, and to the construction and arrangement of which I lay no claim.

I am aware that it has been proposed to make crank-axles from a slab of welded wrought-iron. I therefore make no claim thereto; but What I do claim as my invention, and desire to secure by Letters Patent, is—

1. The manufacture of locomotive and other crank-axles from a plain slab or rolled or hammered ingot of cast malleable iron, cast-steel, or cast semi-steel, by sawing or otherwise cutting away such parts of the mass as will leave a piece of metal having the general form or configuration of the intended crank-axle.

2. In the manufacture of locomotive and other crank-axles made of cast malleable iron, or cast-steel, or cast semi-steel, the twisting of the axle so as to alter the angle of the different throws from the common plane in which they are formed into any desired angle or relative position to each other.

HENRY BESSEMER.

Witnesses:
A. L. HOLLEY,
DAVD. LONGSDON.